United States Patent [19]

Caveney

[11] 4,221,352
[45] Sep. 9, 1980

[54] FLAT CABLE CLAMP

[75] Inventor: Jack E. Caveney, Hinsdale, Ill.

[73] Assignee: Panduit Corp., Tinley Park, Ill.

[21] Appl. No.: 945,379

[22] Filed: Sep. 25, 1978

[51] Int. Cl.² .................................................. F16L 3/08
[52] U.S. Cl. ................................. 248/74 PB; 24/73 PB
[58] Field of Search ............ 24/16 PB, 16 R, 73 PB, 24/73 AP, 73 SA; 206/360, 817; 248/74 R, 74 A, 74 B, 74 PB

[56] References Cited

U.S. PATENT DOCUMENTS

| | | | |
|---|---|---|---|
| 3,223,776 | 12/1965 | Piasecki | 174/138 |
| 3,713,622 | 1/1973 | Dinger | 251/10 |
| 3,719,917 | 3/1973 | Fischer et al. | 339/17 CF |
| 3,727,174 | 4/1973 | Podmore et al. | 339/210 M |
| 3,971,105 | 7/1976 | Caveney | 248/74 PB |
| 3,989,210 | 11/1976 | Berkman et al. | 24/73 SA |

OTHER PUBLICATIONS

Dek, Inc. Catalog No. E-376 (pp. 11-13) 1976.

Primary Examiner—James C. Mitchell
Attorney, Agent, or Firm—Richard B. Wakely; Charles R. Wentzel

[57] ABSTRACT

A clamp for holding one or more generally elongate objects each having opposed generally flat first and second sides, such as flat cables, in parallel stacked relationship. The clamp includes a base extending transversely of the longitudinal direction of the objects and has a surface for engagement with a first side of one of the objects. A cover which also extends transversely of the objects is connected to the base and spaced from the base surface. Finally, the clamp includes resilient pusher means extending from the cover toward the base for engaging a second object side. The pusher means includes a flap extending outwardly from a cover side so that no portion of the flap underlies the cover.

13 Claims, 7 Drawing Figures

FLAT CABLE CLAMP

BACKGROUND OF THE INVENTION

This invention relates to cable clamps and more particularly to a clamp for firmly holding one or more flat cables.

Flat flexible cables, for example, of the type wherein an array of parallel, regularly spaced, coplanar conductors are sandwiched between an upper and lower sheet of insulation have come into rapidly growing use. Such cables are ideally suited for use in electronic computer systems for interconnecting a series of electrical devices at a first location to a corresponding series of devices at a second location. In the past flat cables were generally mounted on a support such as a panelboard by the use of a metal plate having a resilient insulator for engaging the flat cable. The plate was screwed down to the support with the cable positioned between the insulator and the support. It was common that the plate was insufficiently tightened so that the cables were free to move in their longitudinal direction or that the plate was overly tightened causing permanent deformation of the cable.

More recently flat cable mounts having a elongate base and a separate elongate cover have been suggested. The cover and base are encircled by a cable tie, having a toothed strap joined to a locking head for receiving the free end of the strap, or toothed strap portions are formed integrally with the base for reception by locking head portions formed integrally with the cover. Since the locking head can hold the strap at a number of locations these mounts are excellent where it is required to hold the cables at a predetermined tension. However, as these mounts include two or more loose parts and since care is required to align the strap with thelocking head, both hands are needed to install the mounts. Additionally, user judgment is required due to the adjustability of the mounts. Reference may be made to commonly assigned U.S. Pat. No. 3,971,105.

In another type of flat cable clamp the cover and base are joined at first ends by a hinge and have interlocking components at their second ends. The cover is elevated relative to the base a distance corresponding to the height of the maximum number of flat cables to be held. Of course, if the clamp is used with a lesser number of cables, the cables are only loosely held and they might be able to slide in their longitudinal direction. Resilient spaces are available which must be adhered to the base.

SUMMARY OF THE INVENTION

Among the several objects of the present invention may be noted the provision of an improved clamp for mounting one or more flat cables to a support and for forming a plurality of such cables into a bundle; the provision of such clamp which securely compressively holds from one up to a predetermined maximum number of cables without the use of spacers; the provision of such clamp which is securely assembled using only one hand; the provision of such clamp which is one-piece construction, which is light in weight and which is simple ad economical to manufacture. Other objects and features will be in part apparent and in part pointed out hereinafter.

Briefly, the clamp of the present invention comprises a base, a cover connectable to the base, and resilient pusher means integral with the cover and formed of the same material as the cover. The base extends across the cable route and has a surface for engaging a first object side. The cover includes a bridge portion also extending across the cable route and spaced a predetermined distance from the base surface. The pusher means extends from the cover toward the base surface and is adapted to engage a second object side independent of the number of objects to be held from one to a perdetermined maximum number.

BRIEF DESCRIPTION OF THE DRAWINGS

Corresponding reference characters indicate corresponding components throughout the several view of the drawings.

DESCRIPTION OF THE PREFERRED EMBODIMENT

Figure 1:
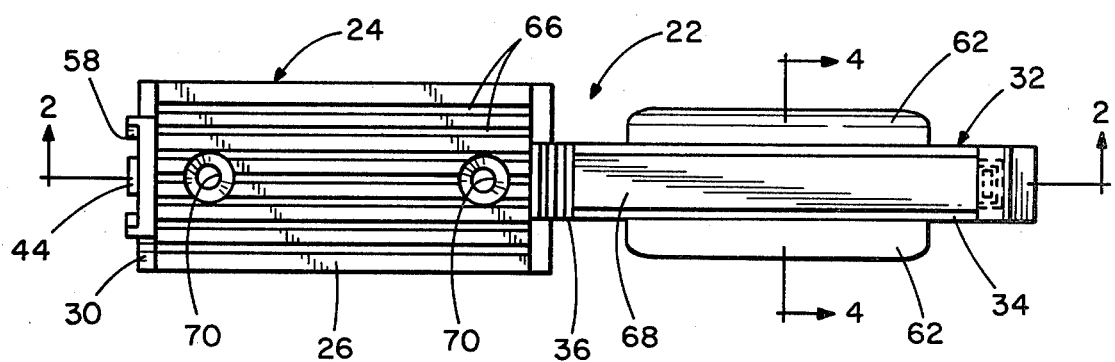
FIG. 1 is a plan of a flat cable clamp of the present invention comprising a base and a cover joined by a hinge.
Figure 2:
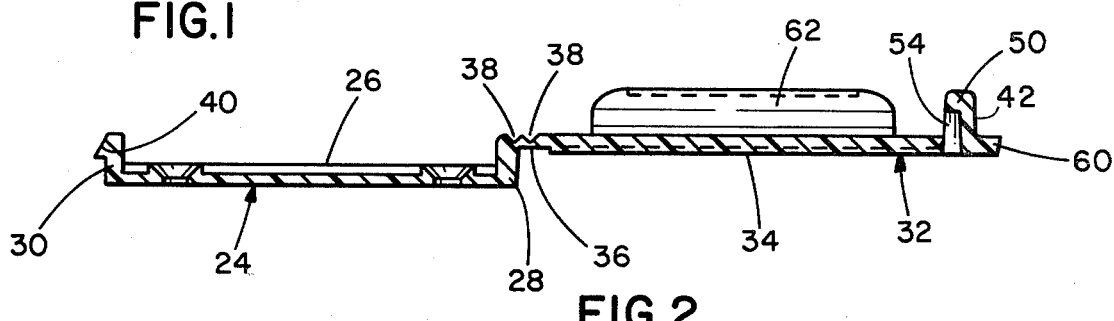
FIG. 2 is a sectional view of the clamp of FIG. 1 taken generally along the line 2—2.
Figure 3:
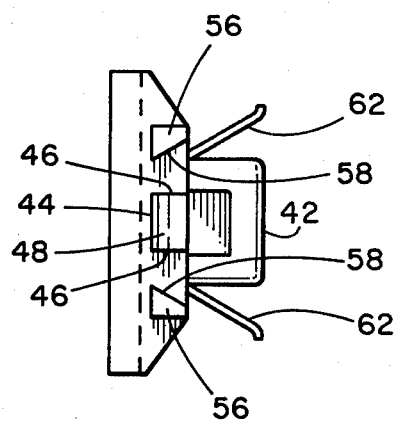
FIG. 3 is an end view of the mount of FIG. 1.
Figure 5:
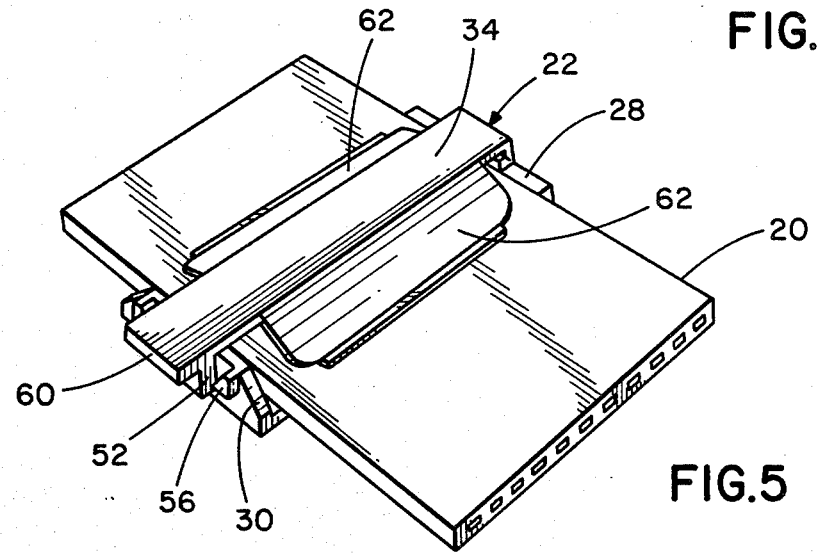
FIG. 5 is a perspective view of the mount holding a flat cable with the cover latched to the base.

Referring now to FIGS. 1 and 2, a clamp for use with one or more elongate objects of the type having opposed generally flat first and second sides, such as the flat cable 20 shown in FIG. 5, is generally indicated by reference numeral 22. More specifically, clamp 22 is useful for mounting from one up to a maximum predetermined number of objects along a predetermined route on a support such as a panelboard and for holding a plurality of the objects in parallel stacked relationship.

Clamp 22 is preferably of one-piece molded thermoplastic construction and comprises a base 24 which, in use, extends transversely of the route of objects 20. Base 24 has a surface 26 lying in a first plane for engaging a first object side and ledges 28, 30 are disposed at the respective first and second ends of the base. The clamp also comprises a cover 32 connectable to base 24 including a bridge portion 34 which, in use, extends transversely of said route, overlying base surface 26 and spaced therefrom a predetermined distance corresponding to the cummulative height of the maximum number of flat cables to be held.

First ends of cover 32 and base 24 are joined by a hinge 36 while their second ends comprise latch means for locking the cover to the base. As best shown in FIG. 2 in the as-molded condition of the clamp, cover 32 extends away from base 24 and the cover is locked to the base by rotating the cover about the hinge through a predetermined number of degrees. Hinge 36, in the as-molded condition of the clamp, includes a pair of adjacent grooves 38 each of which is defined by a pair of surfaces converging at an angle with the sum of the angles corresponding to each groove substantially equalling the predetermined number of degrees whereby the grooves close as the cover is rotated to lock it to the base causing the hinge to form a generally solid mass. More specifically, as shown in FIG. 2 the cover extends away from the base at 180 degrees while the surfaces defining each identical groove 38 intersect at a 90 degree angle.

Figure 4:
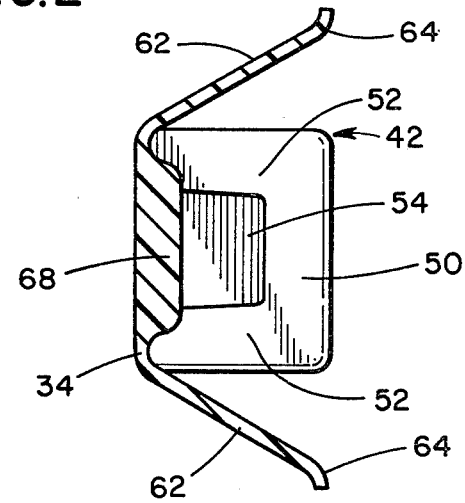
FIG. 4 is a sectional view through the cover taken generally along line 4—4 of FIG. 1.

The latch means comprises a catch 40 on base 24 extending outwardly from ledge 30 and further includes a frame 42 on the cover extending generally perpendicularly from adjacent the bridge portion for holding the catch. Catch 40 includes a bottom abutment surface 44, side abutment surfaces 46 and a ramp surface 48 for deflecting frame 42 outwardly over the catch as the cover is closed. Frame 42 comprises, as best shown in FIG. 4, a bottom wall 50 for engaging surface 44 and side walls 52 for engaging surfaces 46 with the walls defining a socket 54 for receiving catch 40. Bottom wall 50 functions to prevent cover 32 from rotating about hinge 36 while side walls 52 restrict movement of the cover in the longitudinal direction of the flat cables. The latch means further includes guide means, for aligning the frame and catch as the cover is closed, in the form of protuberances 56 straddling catch 40 and including converging guide surfaces 58 for engaging side walls 52. Finally, the latching means includes a release lever 60 extending outwardly from frame 42 for deflecting the frame away from the catch.

Figure 6:
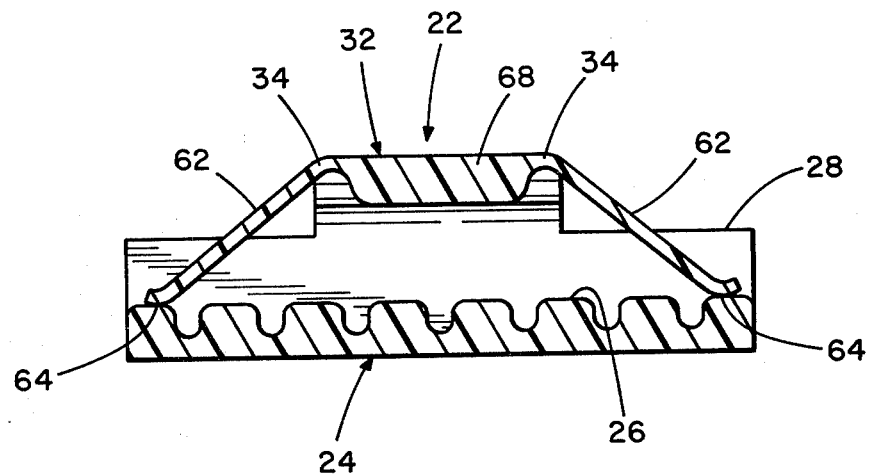
FIG. 6 is a sectional view showing the cover latched to the base without any flat cables held by the clamp.
Figure 7:
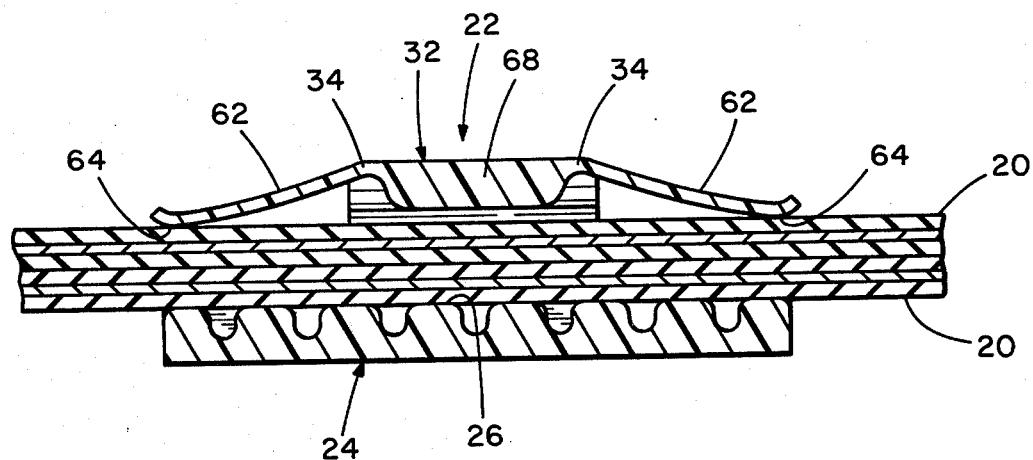
FIG. 7, similar to FIG. 6, illustrates the clamp holding a predetermined maximum number of cables.

Clamp 22 also includes resilient pusher means extending from cover 32 toward base surface 26 for compressively holding flat cables 20 against base surface 26. The pusher means comprises a pair of spaced skirts or flaps 62 disposed intermediate the ends of cover 32 and diverging as they extend from bridge portion 34 toward base surface 26. The distal ends 64 of flaps 62 are arcuate to present a generally smooth surface for engaging a second or upper surface of one of flat cables 20. The flaps have an unloaded position, shown in FIG. 6, wherein cover 32 is latched to base 24 without any objects disposed between bridge portion 34 and base surface 26 and wherein the part of flap distal end 64 closest base surface 26 lies in a plane parallel to the plane of the base surface and spaced therefrom a distance less than the thickness of one flat cable. Flaps 62 are deflectable from their unloaded position to a maximum loaded position, shown in FIG. 7, in which the cover is connected to base 24 with the maximum predetermined number of flat cables positioned between the bridge portion and the base surface. More particularly, flaps 62 engage base surface 26 in their unloaded position and extend generally parallel to the base surface in their maximum load positions. Although FIG. 7 only shows two stacked cables, it will be appreciated that ledges 28 and 30 can be extended to form a clamp able to accomodate a large number of stacked cables.

It will be appreciated that the present invention offers several advantages over prior art structures used for holding flat cables. The present invention is of one-piece construction so that it can conveniently be closed about the flat cables using only one hand. Additionally, the clamp is extremely versatile as it can hold any number of flat cables from one up to the maximum number firmly against the base surface without the use of sponge spacers or other foreign filler material.

The base surface 26 can be provided with spaced elongate grooves 66 to more securely engage the flat cable to prevent its movement in its longitudinal direction. Also cover 32 preferably has a reinforcing rib 68 extending intermediate the cover ends for stiffening bridge portion 34.

Operation of clamp 22 of the present invention is as follows: After base 24 is secured to the support either by using fasteners received by apertures 70 or by the use of adhesives, the cable or cables to be held are stacked on base surface 26 and between ledges 28 and 30. As cover 32 is rotated about hinge 36, flap ends 64 engage the top flat cable surface and compresses the held cables against the base. Due to the resiliency of the plastic material from which the mount is formed and the thinness of flaps 62, continued rotation of the cover toward the base results in spreading of the flaps which in turn causes increasing compressive forces to be applied to the flat cables. Of course, by varying the angle at which the flaps are molded a particular compressive force can be achieved for a given stack height. As closure of the clamp continues, guides 56 move the frame 42 into alignment with catch 40 and the catch ramp surface 48 causes the outward reflection of the frame. When bottom wall 50 clears ramp surface 48, frame 42 is biased to return to its vertical position wherein socket 54 receives catch 40. If it is later desired to add or remove cables, clamp 22 can be conveniently opened by using release lever 60 to deflect frame 42 outwardly from the catch.

It should be appreciated that the latch means can function effectively even if the clamp is overloaded or used to hold a non-flat object which would result in bowing of the cover. With such bowing, the frame 42 would assume an inward cant. However, as the catch extends outwardly from ledge 30, an inward cant would cause bottom wall 50 to remain in effective engagement with abutment surface 44. If catch 40 extended inwardly, such inclination of the frame would result in wall 50 moving away from abutment surface 44 resulting in opening of the clamp.

In view of the above, it will be seen that the several objects of the invention are achieved and other advantageous results attained.

As various changes could be made in the above constructions without departing from the scope of the invention, it is intended that all matter contained in the above descriptions shall be interpreted as illustrative and not in a limiting sense.

What is claimed is:

1. A clamp for mounting from one up to a maximum predetermined number of elongate objects each having opposed generally flat first and second sides, such as flat cables, along a predetermined route on a support such as a panelboard, said clamp comprising:

a base extending transversely of said route and having a surface lying in a first plane for engaging a first object side, a cover connectable to said base and comprising a bridge portion extending transversely of said route and spaced a predetermined distance from said surface, and resilient pusher means integral with said cover and formed of the same material as said cover extending from said cover toward said base surface and having a distal end engageable with a second object surface, said pusher means being deflectable from an unloaded position wherein said cover is connected to said base without any objects disposed between said bridge portion and said base surface and wherein the part of the distal end closest said base surface lies in a second plane parallel to said first plane and spaced therefrom a distance less than the thickness of one of said objects to a maximum load position wherein said cover is connected to said base with said maximum predetermined number of objects positioned between said bridge portion and said base surface whereby, independent of the number of objects held from one to the maximum number, the objects are firmly compressively held against said base surface to restrain their movement relative to said support, said pusher means comprising a flap extending inclined outwardly from said cover toward said first plane when said flap is in its unloaded position.

2. A clamp as set forth in claim 1 wherein said cover and base are integral.

3. A clamp as set forth in claim 2 wherein said cover and said base have respective first ends joined by a hinge and respective second ends comprising latch means for locking said cover to said base.

4. A clamp as set forth in claim 3 of molded thermoplastic construction in which in the as-molded condition of said clamp said cover extends away from said base and the cover is locked to said base by rotating the cover about the hinge through a predetermined number of degrees, said hinge in the as-molded condition of said clamp comprising a plurality of adjacent grooves with each groove defined by a pair of surfaces converging at an angle, the sum of the angles corresponding to each groove substantially equaling said predetermined number of degrees whereby said grooves close as said cover is rotated to lock to said base.

5. A clamp as set forth in claim 3 wherein said latch means comprises a catch on one of said cover and base and a frame defining a socket for receiving the catch on the other of said cover and base.

6. A clamp as set forth in claim 5 wherein said frame is biased to hold said catch but is deflectable away from said catch, said frame comprising a bottom wall for engaging said catch to prevent said cover from rotating about said hinge and further comprising spaced side walls for restricting movement of said cover along said route.

7. A clamp as set forth in claim 6 wherein said latch means further comprises guide means for aligning the catch and frame as the clamp is closed.

8. A clamp as set forth in claim 6 wherein said latch means further comprises a release lever extending from said frame for use in deflecting said frame away from said catch.

9. A clamp as set forth in claim 3 wherein said cover comprises a reinforcing rib extending from adjacent the first cover end to adjacent the second cover end for stiffening said bridge portion.

10. A clamp as set forth in claim 1 wherein said pusher means comprises a pair of spaced flaps which diverge in the direction of said first plane.

11. A clamp as set forth in claim 1 wherein said flap extends substantially parallel to said first plane when in its maximum load position.

12. A clamp as set forth in claim 1 wherein said pusher means in its unloaded position engages said base surface.

13. A clamp for holding a plurality of generally elongate objects each having opposed generally flat first and second sides, such as flat cables, in parallel stacked relationship, said clamp comprising:
a base extending transversely of the longitudinal direction of said objects and having a surface for engagement with the first side of one of said objects,
a cover extending transversely of the longitudinal direction of said objects connected to said base and spaced from said surface, said cover having sides, and
resilient pusher means integral with said cover and formed of the same material as said cover extending from said cover toward said base and engaging the second side of another object, said pusher means comprising a flap extending outwardly from a cover side so that no portion of said flap underlies said cover.

* * * * *

UNITED STATES PATENT AND TRADEMARK OFFICE
CERTIFICATE OF CORRECTION

PATENT NO. : 4,221,352
DATED : September 9, 1980
INVENTOR(S) : Jack E. Caveney

It is certified that error appears in the above-identified patent and that said Letters Patent are hereby corrected as shown below:

Column 3, line 21: "latching" should be ---latch---;

Column 3, line 41: "loaded" should be ---load---;

Column 3, line 50: "large" should be ---larger---;

Column 5, Claim 2:
line 10    add ---said--- after "and".

Signed and Sealed this

Seventeenth Day of February 1981

[SEAL]

Attest:

RENE D. TEGTMEYER

Attesting Officer    Acting Commissioner of Patents and Trademarks